UNITED STATES PATENT OFFICE.

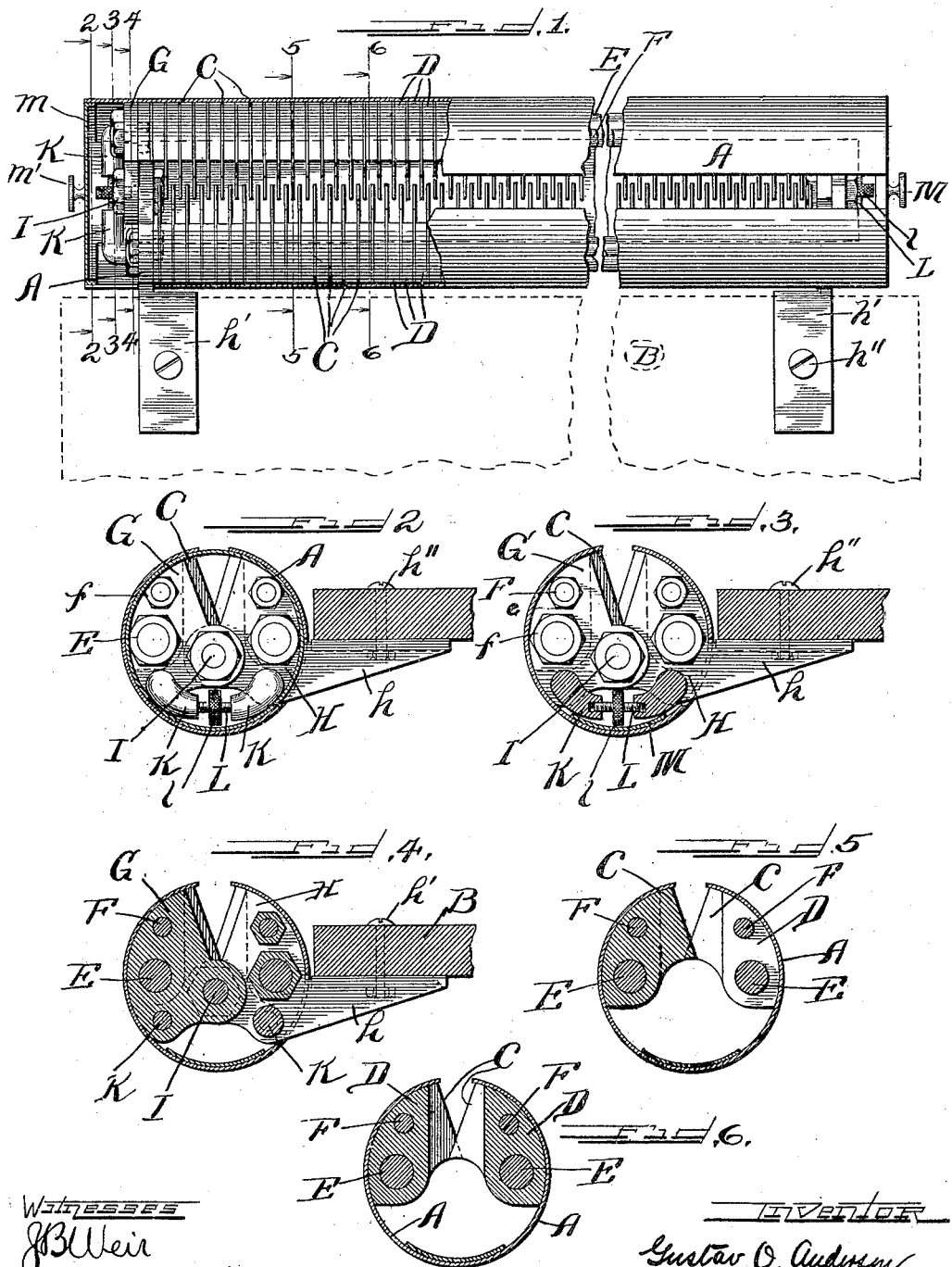

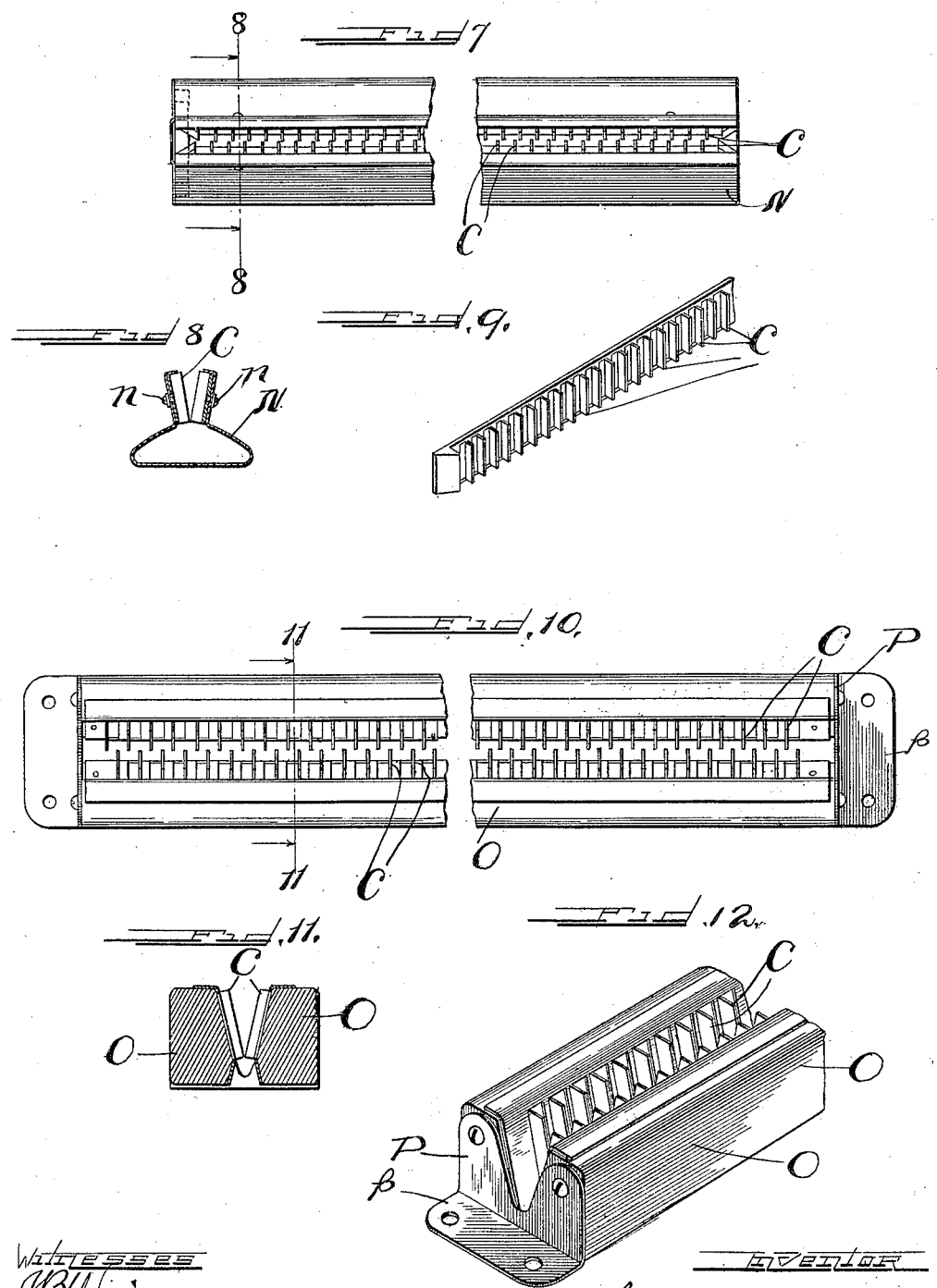

GUSTAV O. ANDERSON, OF CHICAGO, ILLINOIS.

CRAYON-SHARPENER.

SPECIFICATION forming part of Letters Patent No. 679,136, dated July 23, 1901.

Application filed November 19, 1900. Serial No. 36,925. (No model.)

*To all whom it may concern:*

Be it known that I, GUSTAV O. ANDERSON, a citizen of the United States of America, and a resident of the city of Chicago, in the county of Cook and State of Illinois, have invented certain new and useful Improvements in Crayon-Sharpeners, of which the following is a specification.

The object of my invention is to provide a means for sharpening chalk or crayons, particularly the kind thereof used by tailors in laying out and drafting their work, so as to produce on such stalk or crayons a uniformly-sharpened edge throughout their length.

A description of my invention is set out in the following specification, reference being had to the accompanying drawings, in which—

Figure 1 shows a top view, the central portion being broken away to shorten the same and a part of the casing removed to disclose the internal construction. Fig. 2 is a sectional view on the line 2 2. Fig. 3 is a sectional view on the line 3 3. Fig. 4 is a sectional view on the line 4 4. Fig. 5 is a sectional view on the line 5 5. Fig. 6 is a sectional view on the line 6 6. Fig. 7 represents a modified form of construction. Fig. 8 is a section of the same on the line 8 8. Fig. 9 shows a method of constructing the knives or cutters shown in Fig. 7 and also in Fig. 10 following. Fig. 10 shows another modified form of construction in which the cutters are supported by a wooden framework. Fig. 11 is a cross-section of the same on the line 11 11. Fig. 12 shows a perspective view of one end of the modification shown in Fig. 10.

Referring further to the drawings, in which like characters of reference denote like parts throughout, A is a casing inclosing the main structure of a preferred form of my device, the same being attached to a table B by the means hereinafter described.

C C are cutters provided for sharpening the crayon, a suitable form of which in this construction is shown in Fig. 5. The cutters on each side are separated from each other by spacing-blocks D, which may be of the form shown in Fig. 6. The cutters and spacing-blocks are held in their relative positions and secured firmly together by rods or bolts E F passing therethrough, which are provided at one end with adjusting-nuts *e f*. The thus-assembled knives should be mounted so that those on one side of the structure alternate with the knives on the other side, leaving a V-shaped channel between them which corresponds to the edge which the crayon is to receive when sharpened thereby. To maintain the proper relative position of the knives, binding-plates G H are placed at the end of the assembled knives on each end of the structure, the rods E F passing therethrough, and the whole are clamped firmly together by the nuts *e f*. Projections or ears overlapping each other on the said binding-plates are perforated with a suitable opening, through which passes a bolt or binding-screw I, which forms a pivot upon which the knives on either side of the structure may be turned to vary the angle at which they present their edges to each other. As a means of making such adjustment internally-threaded lugs or projections K are carried on the binding-plates E F and a double-ended screw L, with right and left hand threads and a knurled head *l*, is fitted thereto. When it is desired to change the angle at which the knife-edges stand to each other, so as to give a differently-formed edge to the crayon when drawn through the channel formed by them, the binding-screws I are loosened sufficiently to free the binding-plates and to permit a pivotal motion thereof on the binding-screw. The adjusting-screw L is then turned until the desired angle between the knives is obtained, whereupon the latter are clamped in that position by the binding-screw I.

The binding-plates H at each end of the device have a projecting arm *h*, with a flange *h'* at right angles thereto. The flange is perforated to permit the passage of a screw *h''* and provides a broad bearing by which the whole may be securely attached to the table B.

M is a slide or drawer at the lower portion of the casing A to receive the dust or cuttings which are removed from the crayons by the action of the knives. The said slide M is secured to a cap *m*, which fits the circular opening at the end of the casing, and the whole may be withdrawn and removed by means of the knobs *m'*.

The knives C are best made of very thin and flexible steel. The resiliency thus obtained gives a much better sharpening action upon the crayons than if a rigid or inflexible knife is used, and when such flexible material is used it is not necessary to give a beveled edge to the knives, for as the crayon should be sharpened by being drawn first from one end to the other of the device and then drawn in the opposite direction the knives become practically self-sharpening. This resiliency further acts to free the knives from powdered chalk, especially when mixed, as sometimes it is, with wax, which tends to adhere thereto.

The spacing-blocks D may be of metal, but preferably should be of paper, fiber, or similar material to reduce the weight of the device.

The casing A is in circular form, and a practical method of making the same is to use a tube of proper length and of such diameter that when spread to disclose the channel formed by the knife-edges it will closely embrace the above-described mechanism. This casing when put in place by its elasticity should securely hold the interior structure of the device and accommodate itself to the varying adjustments of the knives.

In the modified form shown in Figs. 7, 8, and 9 the knives C are formed out of a continuous strip of steel or other metal by cutting openings therein corresponding to the size of the several knives and turning the latter up at right angles to the main strip on the side of the opening at which the metal is left intact. A series of knives of uniform size and spacing being thus provided, the strip may be mounted in a metallic casing N and secured therein by screws n or other appropriate means. Another similar method of applying the principles of my invention is illustrated in Figs. 10, 11, and 12, in which strips with integrally-formed knives are secured to the sides of the wooden strips O, which are held in proper relative position to each other by the end blocks P, which also furnish a means of securing the structure to a table by the integrally-formed flange p.

Having described the principles of my invention and illustrated the same by several practical and operative examples thereof, I do not limit myself to the structural forms shown and described; but

I claim, and desire to secure by Letters Patent, the following:

1. A crayon-sharpener comprising a multiplicity of spring-metal cutters arranged alternately to each other to form the opposite sides of a V-shaped channel, and means for securing together in alinement with each other the cutters on each side of the said channel, substantially as described.

2. A crayon-sharpener comprising a multiplicity of spring-metal cutters arranged alternately to each other to form opposite sides of a V-shaped channel, means for securing together in alinement with each other the cutters on each side of the said channel, and means for varying the angle of said channel by adjusting the cutters on either side thereof, substantially as described.

3. In a crayon-sharpener the combination of a casing, means for securing the same to a bench or table, a multiplicity of spring-metal cutters rigidly secured together on either side of a V-shaped channel, and means for varying the angle of said channel by adjusting the cutters on either side thereof, and a dust-receptacle beneath the said cutters and inclosed within the said casing, substantially as described.

4. A cutter-strip for a crayon-sharpener formed of a thin sheet of flexible and resilient material and provided with a multiplicity of cutters formed by cutting completely through the strip so as to partially detach portions of the body material and then turning the partially-detached portion to an angle with the strip, substantially as described.

5. In a crayon-sharpener parallel knife-mounting rods, spring-metal knives with non-beveled edges mounted on said rods and arranged alternately to each other to form opposite sides of a V-shaped channel, and means connected with the rods for varying the angle between the knives, substantially as described.

6. In a crayon-sharpener parallel knife-mounting rods, spring-metal knives with non-beveled edges mounted on said rods and arranged alternately to each other to form opposite sides of a V-shaped channel, spacing-blocks between the said knives, and means connected with the rods for varying the angle between the knives, substantially as described.

7. In a crayon-sharpener having parallel knife-mounting rods, knives mounted thereon at right angles thereto, spacing-blocks between the said knives, binding-plates at the extremities of said rod to inclose the said plates and spacing-blocks, and projections on the spacing-blocks by which the same are pivotally attached to each other so as to make a free vertical opening between the several knives and between the knives on either side of the sharpener, substantially as described.

Signed at Chicago this 17th day of November, 1900.

GUSTAV O. ANDERSON.

Witnesses:
LOUIS C. TÉTARD,
A. S. PHILLIPS.